(12) United States Patent
Pandharpure et al.

(10) Patent No.: US 12,537,818 B2
(45) Date of Patent: Jan. 27, 2026

(54) SYSTEM AND METHOD OF SECURELY EXECUTING IOT DEVICE COMMANDS IN POWER DISTRIBUTION AND DEFENSE DEVICES

(71) Applicant: EATON INTELLIGENT POWER LIMITED, Dublin (IE)

(72) Inventors: Amar Pandharpure, Pune (IN); Harish Bhattbhatt, Pune (IN); Shailesh Maheshwari, Pune (IN); Reema Parkhe, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 173 days.

(21) Appl. No.: 18/370,942

(22) Filed: Sep. 21, 2023

(65) Prior Publication Data

US 2025/0106206 A1   Mar. 27, 2025

(51) Int. Cl.
*G06F 21/00* (2013.01)
*H04L 9/40* (2022.01)

(52) U.S. Cl.
CPC ........ *H04L 63/0876* (2013.01); *H04L 63/083* (2013.01); *H04L 63/108* (2013.01)

(58) Field of Classification Search
CPC . H04L 63/0876; H04L 63/083; H04L 63/108; H04L 63/08; H04L 63/101; H04L 2463/082; H04W 12/06; Y04S 40/20
See application file for complete search history.

(56) References Cited

U.S. PATENT DOCUMENTS 9,047,473 B2    6/2015  Samuelsson et al.
9,787,690 B2   10/2017  Zhu et al.
10,257,263 B1* 4/2019  Wagner .................. H04L 12/66
(Continued)

FOREIGN PATENT DOCUMENTS

CN    102780698 A    11/2012
CN    103139058 A     6/2013
(Continued)

OTHER PUBLICATIONS

European Patent Office "Extended European Search Report" for corresponding EP Patent Application No. 24201621.0, dated Feb. 1, 2025, 10 pp.

*Primary Examiner* — Kendall Dolly
(74) *Attorney, Agent, or Firm* — Eckert Seamans Cherin & Mellott, LLC

(57) ABSTRACT

A system includes a facility including a plurality of IoT PDDs; a first end user device structured to transmit a request for a command for a target IoT PDDD; second end user devices structured to receive second factor authenticators based on a first tier validation of the request in a two-tiered validation and return the second factor authenticators for a second tier validation of the request based on second user inputs from corresponding authorized command approvers; and a cloud network including a REST API and a cloud server, the REST API structured to interface with the IoT PDDDs, the first and second end user devices and the cloud server, the cloud server including an IoT PDDD commands execution manager coupled to the REST API and structured to perform the two-tiered validation and execute the command for the target IoT PDDD upon a successful two-tiered validation via the REST API.

17 Claims, 6 Drawing Sheets

(56) References Cited

U.S. PATENT DOCUMENTS

| | | | |
|---|---|---|---|
| 10,270,863 B1 | 4/2019 | Swengler | |
| 2023/0188346 A1* | 6/2023 | King | H04L 9/3247 713/168 |
| 2025/0233743 A1* | 7/2025 | Aldweesh | H04L 63/166 |

FOREIGN PATENT DOCUMENTS

| | | | | |
|---|---|---|---|---|
| CN | 104796265 A | | 7/2015 | |
| WO | WO-2022106885 A1 | * | 5/2022 | |
| WO | WO-2023014985 A1 | * | 2/2023 | G06N 20/00 |

* cited by examiner

SYSTEM AND METHOD OF SECURELY EXECUTING IOT DEVICE COMMANDS IN POWER DISTRIBUTION AND DEFENSE DEVICES

FIELD OF THE INVENTION

The disclosed concept relates generally to a system and method of securely executing commands via a cloud server, and in particular, to a system and method of executing IoT device commands in power distribution and defense devices via the cloud server.

BACKGROUND OF THE INVENTION

Cloud computing shares computing resources that are generally accessed via the Internet. Particularly, its infrastructure allows user to access a shared pool of computing resources, such as servers, storage devices, networks, applications, and/or other computing-based services. As such, the users and clients can remotely access computing resources on demand. IoT (Internet of Things) or edge IoT devices are physical electronic devices that are connected to a communication network, e.g., LAN, WAN, etc. and may be configured to transmit and receive information via the network. IoT devices can access cloud computing services or interact with an application via cloud servers and the network. IoT devices may be stationary, e.g., home appliance or manufacturing equipment, or mobile, e.g., cellular phones, vehicles accessories, etc. More and more devices are becoming IoT devices in consumer, industrial, energy, transportation, military and other fields.

However, as the IoT devices become ubiquitous, they become visible over the Internet, and thus vulnerable to attacks and unauthorized accesses by hackers or misfeasors. Upon a successful attack, the IoT devices become controllable by the hackers, potentially resulting in freezing of the devices or related systems and/or other dire consequences. Specifically, if mission critical devices such as power distribution and defense devices (PDDD) including, e.g., without limitation, circuit breakers, switch gears, transfer switches, and variable frequency drives (VFDs), become compromised by hackers or misfeasors, that could result in a shutdown of an entire plant or facility in which the compromised IoT PDDDs are located. Currently, effective security standards or mechanisms for IoT devices are lacking.

There is room for improvement in IoT device communications.

There is a need for an improved system and method for securely executing IoT device command in IoT PDDDs.

SUMMARY OF THE INVENTION

A system for remotely executing device commands is provided. It includes a first end user device structured to transmit a request for a command for a target IoT PDDD based on a first user input from an authorized first end user; a facility including a plurality of Internet-of-Things (IoT) power distribution and defense devices (PDDDs); a plurality of second end user devices structured to receive second factor authenticators based on a first tier validation of the request in a two-tiered validation and return the second factor authenticators for a second tier validation of the request based on second user inputs from corresponding authorized command approvers; and a cloud network including a REST API and a cloud server, the REST API being communicatively coupled to the IoT PDDDs, the first end user device and the second end user devices and structured to interface therewith for the two-tiered validation of the request and execution of the command, the cloud server including an IoT PDDD commands execution manager coupled to the REST API and structured to perform the two-tiered validation of the request and execute the command for the target IoT PDDD based on the successful validation via the REST API.

Another example embodiment provides a method of executing device command for a target Internet-of-Things (IoT) power distribution and defense devices (PDDDs) via a cloud network including a REST API and a cloud server. The method includes transmitting, by a first end user device, a request for a command for a target IoT PDDD based on a first user input from an authorized first end user; performing, by an IoT PDDD command execution manager in the cloud server, a two-tier validation of the request includes a first tier validation of a first authentication information and a second tier validation of second factor authenticators returned from authorized command approvers via the authorized second end user devices to the REST API; and executing, by IoT PDDD command execution manager, the command requested based on a successful two-tier validation of the request.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
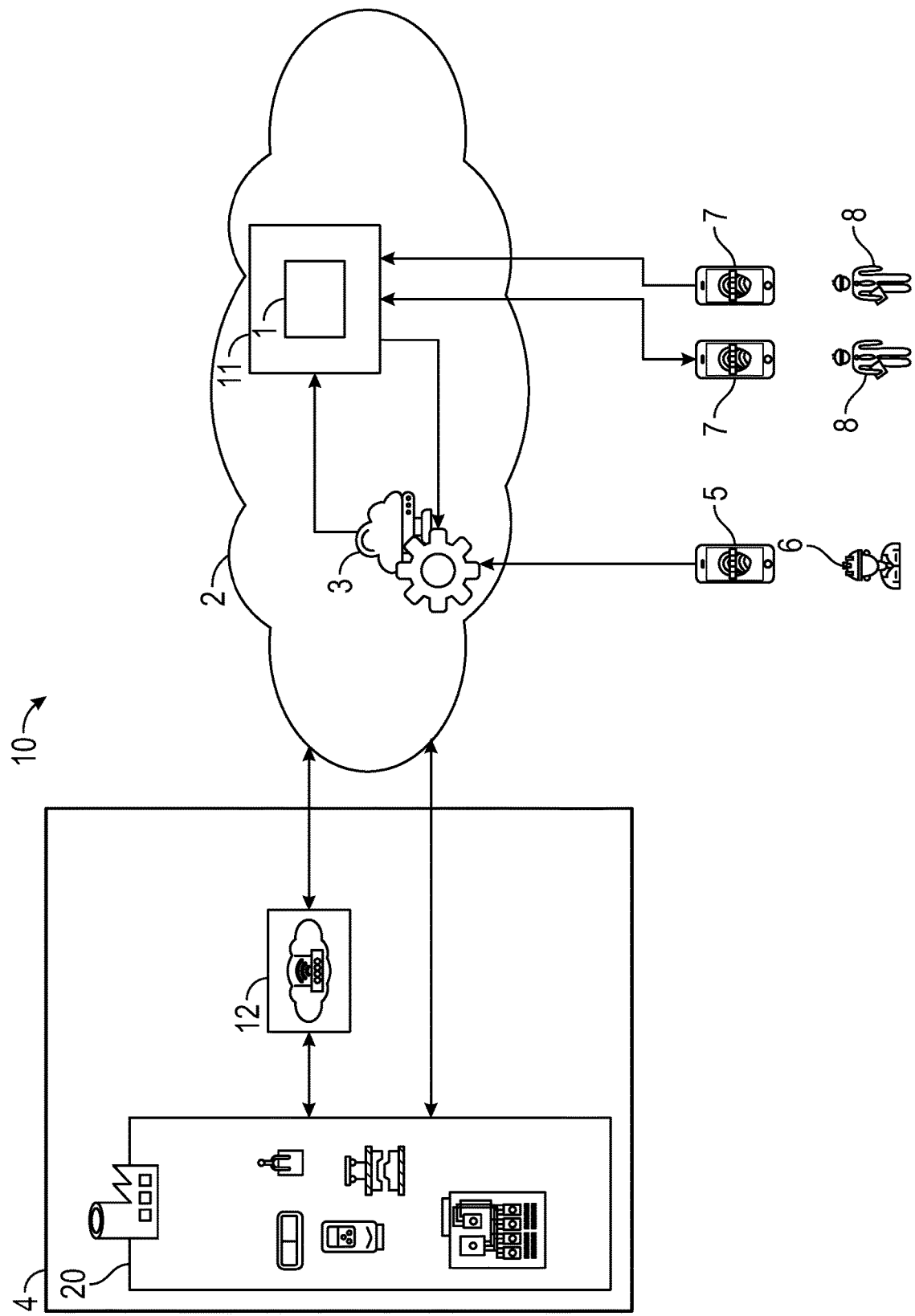
FIG. 1 is diagram of an exemplary system for securely executing device commands in Internet-of-Things (IoT) power distribution and defense devices (PDDDs) via a cloud server in accordance with a non-limiting embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
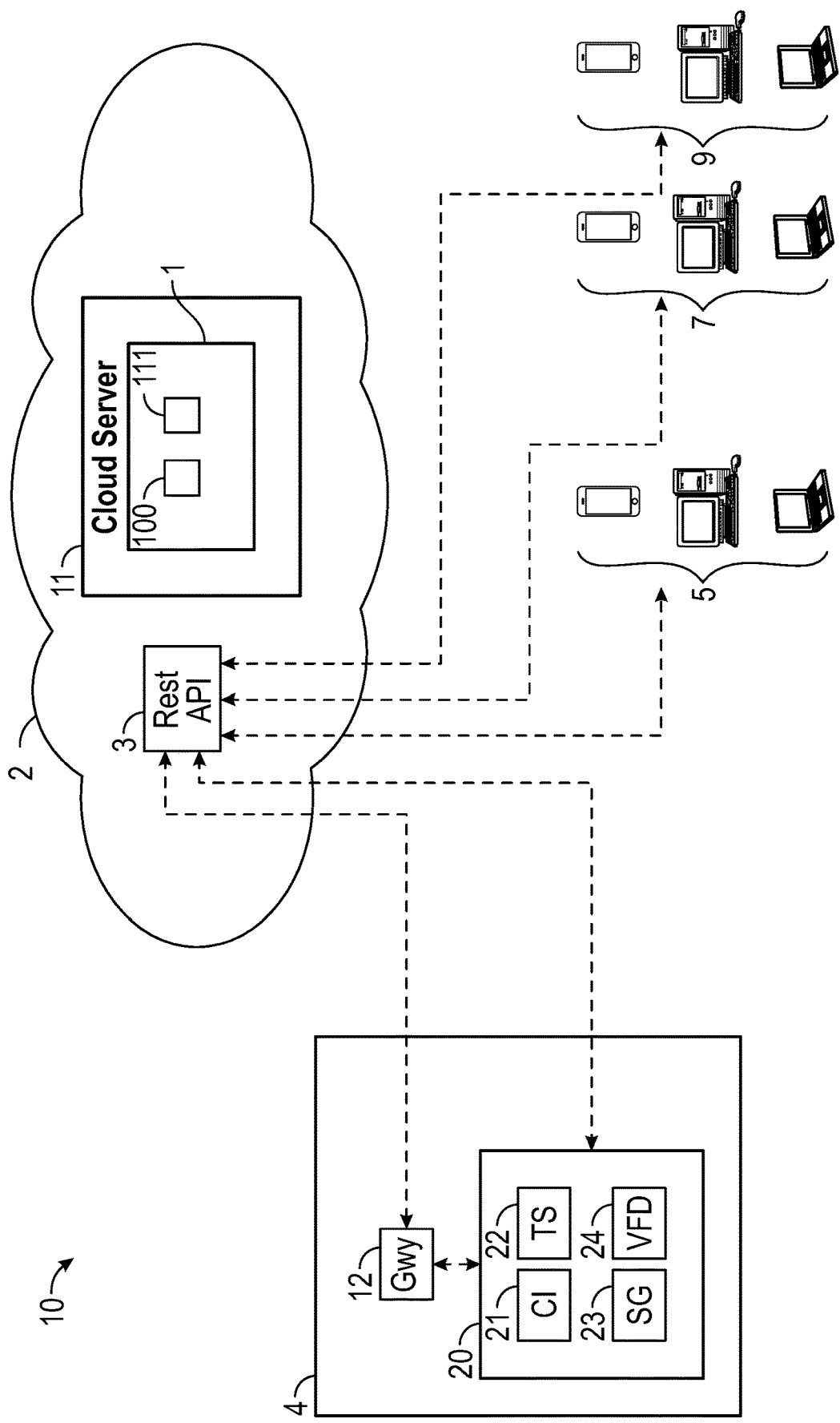
FIG. 2 is a block diagram of an exemplary system for securely executing devices commands in IoT PDDDs via a cloud server in accordance with a non-limiting embodiment of the disclosed concept.
Figure 3:
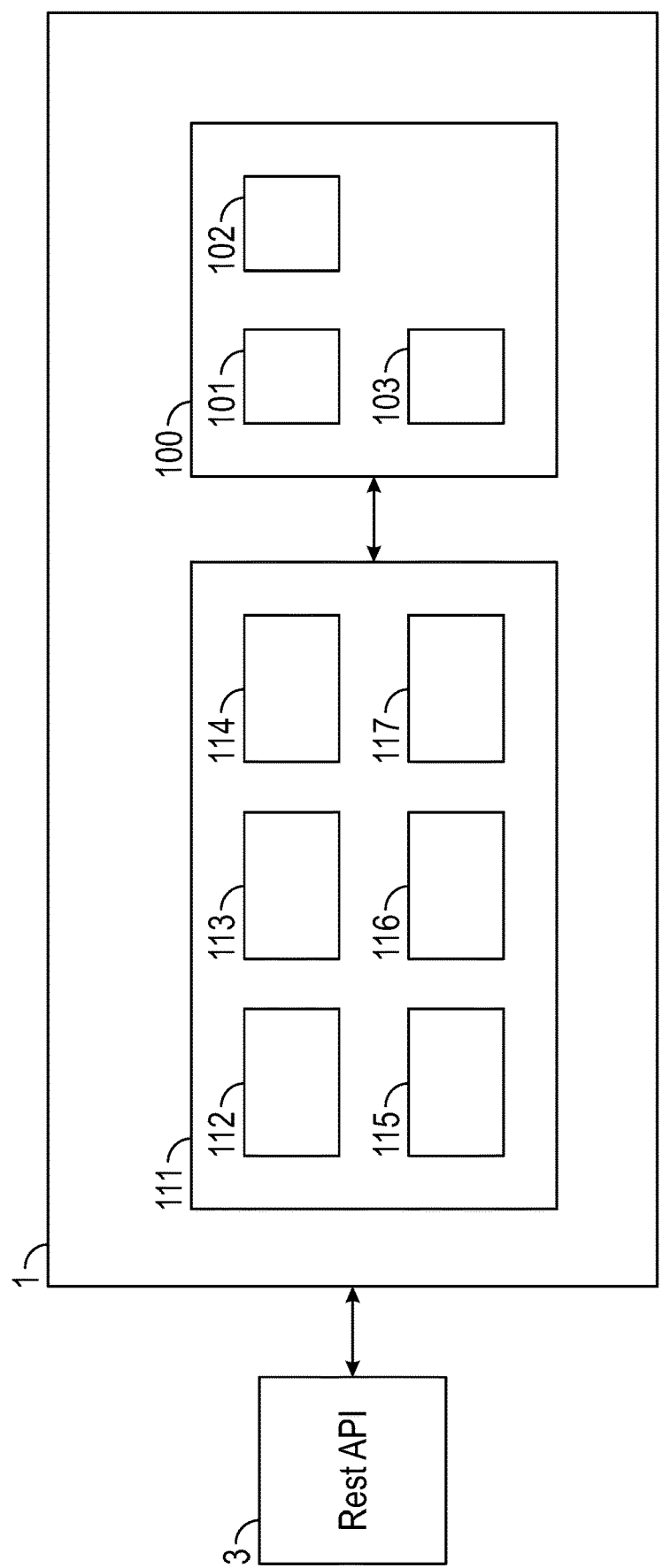
FIG. 3 is a block diagram of an exemplary IoT PDDD command execution manager in accordance with a non-limiting embodiment of the disclosed concept.

FIGS. 1-2 illustrate a system 10 for securely executing commands in Internet-of-Things (IoT) power distribution and defense devices (PDDDs) 20 via a cloud network 2 in accordance with a non-limiting embodiment of the disclosed concept. FIG. 3 illustrates an IoT PDDD commands execution manager 1 in the cloud network 2 for the IoT PDDDs 20 in accordance with a non-limiting embodiment of the disclosed concept. The system 10 and its components are discussed with reference to FIGS. 1-3. The system 10 includes a facility 4, end user devices 5, 7 and a cloud network 2. The facility 4 may be a power plant, a manufacturing facility, or other industrial structures and include IoT PDDDs 20 and a gateway 12. The IoT PDDDs 20 comprise one or more of, e.g., without limitation, a circuit interrupter 21, a transfer switch 22, a switchgear 23, or a variable frequency drive (VFD) 24. The IoT PDDDs 20 may be communicatively coupled to the cloud network 2, particularly the REST API 3, directly in a wireless connection or indirectly via the gateway 12 in a wireless or wired connection. The gateway 12 may be disposed within, e.g., without limitation, LAN, WAN of the facility 4 via a wireless connection (e.g., without limitation, Internet, WiFi, etc.). The IoT PDDDs 20 can be remotely controlled by a cloud server 11, particularly the IoT PDDD commands execution manager 1, in the cloud network 2 via the REST API 3 over the wireless connection. For example, the IoT PDDD commands execution manager 1 may change status of the circuit interrupter 21 by executing commands via the REST API 3. It may execute commands to enable or disable an arc flash reduction managing mechanism on a circuit interrupter 21 via the REST API 3. In some examples, it may execute commands to start or stop a VFD 24 via the REST API 3. In some examples, it may execute commands to switch a transfer switch 22 from one power source to another via the REST API 3.

The end user devices comprise a first end user device 5 and a plurality of second end user devices 7. Optionally, they may also include one or more third end user device 9. Each end user device 5, 7, 9 includes an IoT PDDD commands execution application and communicatively coupled to the REST API (representational state transfer application programming interface) 3 in the cloud network 2 via the wireless connection. It may be any type of computing device (e.g., without limitation, a mobile phone, a laptop, a desktop, a workstation, etc.) capable of accessing and communicating the cloud server 2 via the wireless connection. The first end user device 5 is structured to transmit a request for a command for a target IoT PDDD 20 based on a first user input from an authorized first end user 6. It may be an authorized device via which an authorized first end user (e.g., without limitation, field operator) 6 sends a request for a command for a target IoT PDDDs 20 to the IoT PDDD commands execution manager 1 via the REST API 3. The first user input includes the first end user 6 entering the request and user credentials over an application in the first end user device 5. The second end user devices 7 are structured to receive second factor authenticators based on a first tier validation of the request in a two-tiered validation and return the second factor authenticators for a second tier validation of the request based on second user inputs from corresponding authorized command approvers 8. Each second end user device 7 may be an authorized device of an authorized command approver 8, via which the authorized command approver 8 receives a second factor authenticator from the REST API 3 and returns the second factor authenticator to the REST API 3 as a command approval or denies the request by either not responding or rejecting the request. The one or more third user end devices 9 is structured to receive an escalated request including a third factor authenticator and return the third factor authenticator to the REST API 3 as an escalated command approval. While FIGS. 1-2 illustrate a plurality of second end user devices 6 corresponding to a plurality of command approvers 8, the system 10 may comprise a single second end user device 7 as desired or appropriate without departing from the scope of the present disclosure.

The cloud network 2 acts as a platform that provides additional computing resources to client devices, e.g., without limitation, the IoT PDDD 20 within the facility 4. For example, by utilizing the cloud network 2 client users (e.g., without limitation, the utility, a power management company, etc.) can build or configure software applications or algorithms such as the IoT PDDD commands execution application to be used and/or updated by clients' customers, e.g., without limitation, personnel of the facility 4 including the end users 6, 8. The cloud network 2 includes the REST API 3 and a cloud server 11. The REST API 3 is communicatively coupled to the IoT PDDDs 20, the first end user device 5, the second end user devices 7, and/or the third end user devices 9. It is structured to interface with the IoT PDDDs 20, the cloud server 11, and the end user devices 5, 7 for the two-tiered validation of a request for a command for a target IoT PDDD 20 from the first end user device 5 and execution of the command based on a successful two-tiered validation. For example, the REST API 3 is structured to register device signature of the end user devices 5, 7, 9 and match returned second and/or third factor authenticators with original second and/or third factor authenticators issued to the corresponding command approvers. It can be configured or modified by the client (e.g., without limitation, a power management company) or the client customers (e.g., manufacturing plants or facilities 4). As such, it can be configured to interface with the IoT PDDD command execution manager 1 to set forth authorized end users and the command approvers and predefine periods in which the command approvals are to be received as per the user configured validation rules.

The cloud server 11 may be dedicated to a particular client of the cloud platform and include the IoT PDDD commands execution manager 1 coupled to the REST API 3 and structured to perform two-tiered validation of the request and execute the command for the target IoT PDDD 20 based on the successful two-tiered validation via the REST API 3. The IoT PDDD commands execution manager 1 may be a processing unit including controller 111 and a memory 100. The controller 111 may be a microprocessor, a microcontroller, or some other suitable processing device or circuitry. It may access the memory 100 and perform, e.g., without limitation, authentication, execution and/or escalation functions based on the instructions stored in the memory 100. The controller 111 may include an authentication module 112, a validation rules configuration module 113, a command execution module 114 and a lockout module 115. The memory 100 can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory 100 may include a software, firmware, set of instruction to authenticate, execute commands, audit log, perform lockout or perform escalated authentication.

The validation rules configuration module 113 is structured to configure validation rules setting forth the two-tiered validation. The validation rules are modifiable by authorized end users, e.g., without limitation, authorized administrator of the facility 4 via the IoT PDDD command execution application. The two-tiered validation includes a first tier validation of a first authentication information and a second tier validation of second factor authenticators returned from authorized command approvers 8 via the authorized second end user devices 7. The first authentication information includes a target IoT PDDD ID, a command ID, user credentials (e.g., without limitation, the user IDs and passwords) of the first end user 6, and device information of the first end user devices 5. Device information includes, e.g., without limitation, device signatures such as the MAC addresses and IP addresses of the first end user device 5 from which the request has been originated. A target IoT PDDD ID is a unique identifier of the target IoT PDDD 20 on which the requested command needs to be executed. A command ID is a unique ID that depends on a type of the command requested. For example, if the first end user 6 desires to enter a request for a command to stop a VFD 24, the first end user 6 opens the IoT PDDD command execution application on the first end user device 5 and enters user credentials, request, the VFD device ID, and the command ID for stopping the VFD 24. The REST API 3 receives and transmits the first authentication information to the authentication module 112. The authentication module 112 is structured to receive the first authentication information from the REST API 3 and validate the first authentication information based on an authentication catalog 101 stored in the memory 100. That is, the authentication module 112 accesses an authentication catalog 101 and determines if the user credentials of the first end user 5 and the device information of the first end user device 6 transmitting the request match authorized user credentials and device information of authorized first end user device corresponding to the authorized user credentials in the authentication catalog 101.

The authentication catalog 101 includes, e.g., without limitation, a list of IoT PDDDs 20 remotely executable by the command execution module 114, a list of command IDs for each listed IoT PDDD, a list of the device information of authorized first end user devices 5 that are allowed to transmit a request for a command for execution of each listed IoT PDDD, a list of user credentials of the authorized end user 6 who are allowed to make the request, and a list of the device information of authorized second end user devices 7 via which authorized command approvers are allowed to receive return respective second factor authenticators to the REST API 3. If the authentication module 112 determines that the user credentials of the first end user 6 and device information of the first end user device 5 being used to transmit the request match authorized user credentials and device information of an authorized first end user device corresponding to the authorized user credentials, the authentication module 112 validates the first authentication information. The first tier validation is deemed successful. If the user credentials do not match, the first validation has failed and the authentication module 112 notifies the first end user 6 of the failure to validate via the REST API 3. The first end user 6 may retry the log-in. There will be a limit (e.g., without limitation, 2 or 3 retries) to a number of retry log-in attempts.

Upon validating the first authorization information, the authentication module 12 determines if the target IoT PDDD 20 is in a lockout mode for, e.g., maintenance by the lockout module 115. The lockout module 115 is structured to lock out or tag out an IoT PDDD 20 for a first predefined period (e.g., without limitation, 90 s, 10 minutes, 1 hour, a day, etc.) based on a lockout request by an administrator. The authentication module 112 terminates the two-tier validation based on a determination that the target IoT PDDD is in a lockout mode and notifies the first end user 6. For locking out, an authorized administrator of the facility 4 can trigger a lockout command on an IoT PDDD 20. The lockout module 115 places the IoT PDDD 20 in a lockout mode such that the IoT PDDD 20 cannot be remotely executed by the command execution module 114 via the REST API 3 during the first predefined period. Upon a lapse of the first predefined period, the lockout module 115 releases the IoT PDDD 20 from the lockout mode and the remote execution may take place thereafter.

Based on a determination that the target IoT PDDD 20 is not in a lockout mode, the authentication module 112 next identifies authorized command approvers for the request, obtains authorized command approver information for the target IoT PDDD 20, and transmits the authorized command approver information to the REST API 3. The authorized command approver information includes names and user credentials of the authorized command approvers and device information of the authorized second end user devices 7 via which corresponding authorized command approvers 8 are permitted to interface with the REST API 3. The REST API 3 then generates and transmits second factor authenticators to the authorized command approvers 8 via the corresponding authorized second end user devices 7. The second factor authenticators may be a one-time-passcode (e.g., without limitation, a token) that expires within a second predefined period, e.g., without limitation, 60 s, 90 s, 120 s, etc. The REST API 3 waits for the second predefined period and determines if it has received all of the second factor authenticators back from the authorized command approvers 8 within the second predefined period. If it has received all of the second factor authenticators within the second predefined period, the REST API 3 determines that the second validation has been successful and informs the command execution module 114 of the successful second validation. The command execution module 114 then notifies the first end user 6 that the request has been approved and executes the command requested for the target IoT PDDD 20 via the REST API 3 in the wireless connection. If the REST API 3 has not received all of the second factor authenticators within the second predefined period, then the command execution module 114 notifies the first end user 6 of the failure to validate. In some examples, a disclaimer of impact associated with the target IoT PDDD 20 may be configured in the memory 100 and transmitted with the second factor authenticators. As such, the REST API 3 may also request an acknowledgement of the disclaimer from the authorized command approvers 8 in terms of yes or no. The acknowledgement then may be verified by the REST API 3 or the authentication module 112. The two-tiered validation procedure is also discussed in detail with reference to FIG. 4.

As such, unlike the conventional authentication process of IoT devices that provides only one tier authentication of IoT command requests, the IoT PDDD command execution manager 1 provides a two-tiered validation of a request for command of the target IoT PDDD 20, thereby increasing safety features for remote command execution of the IoT PDDDs 2. Such added safety features ensures secure execution of mission critical IoT PDDDs 20 over the Internet.

In some examples, the IoT PDDD command execution manager 1 may include a tracking module 116 structured to log all of requests for commands made for each IoT PDDD 20 for tracking during a validation session. The memory 100 may include an audit log 103 for such tracking. The confidential information such as the second factor authenticators and user credentials are logged with encryption for security in the audit log 103 in the memory 100. The audit log 103 includes user email of the command approvers who have approved or not approved the request and command execution status. The tracking module 116 may perform error audit in case of system errors.

In some examples, IoT PDDD command execution manager 1 may also include an escalation module 117 structured to escalate the second tier validation if the REST API 3 has not received all of the second factor authenticators from the authorized command approvers 8. Based on a determination that the REST API 3 has not received all of the second factor authenticators from the authorized command approvers 8, the escalation module 117 access an escalation matrix 102, identifies an authorized escalated command approver corresponding to a non-responsive command approver 8 and transmits the information of the authorized escalated command approver and device information of an authorized third user device 9 corresponding to the authorized escalated command approver to the REST API 3. The escalation matrix 102 includes information of authorized escalated command approvers for each authorized command approvers 8 and device information of authorized third user end device 9 corresponding to the authorized escalated command approver. The escalation matrix 102 may include further authorized escalated command approvers in case the initial escalated command approvers also fail to respond within a third predefined period, e.g., without limitation, 60s, 90s, 120s, etc. The escalation matrix 102 may include a plurality of escalation levels including different authorized escalated command approvers at each level in case of escalated command approvers in preceding escalation level have failed to respond. The escalation matrix 102 may be stored in the memory 100. The administrator of the facility 4 may modify the escalation matrix as desired via the IoT PDDD command execution application.

The REST API 3 then generates an escalated request including a third factor authenticator and transmits the third factor authenticator to the authorized escalated command approver to return to the REST API 3. The third factor authenticator is a one-time-passcode that expired within the third predefined period. The REST API 3 may repeat the generation and transmitting third factor authenticators to authorized escalated command approvers until all of the escalation levels has been exhausted. The command execution module 114 notifies the first end user 6 of the approval and executes the command based on a determination that the REST API 3 has received the third factor authenticator from the authorized escalated command approver within the third predefined period. If the escalated request also fails or is rejected, the authentication module 112 notifies the first end user 6 the failure or rejection. This escalation procedure is advantageous in that a failure to execute a command of a mission critical IoT PDDD 20 due to an inadvertent non-responsiveness of one or more of the authorized command approvers 8 may be prevented by immediately escalating the request to and obtaining a final approval of the request from an authorized escalated request approver of the one or more non-responsive authorized command approvers 8. Further, it allows finding best suited or available command approvers for the request at any given time.

Figure 4:
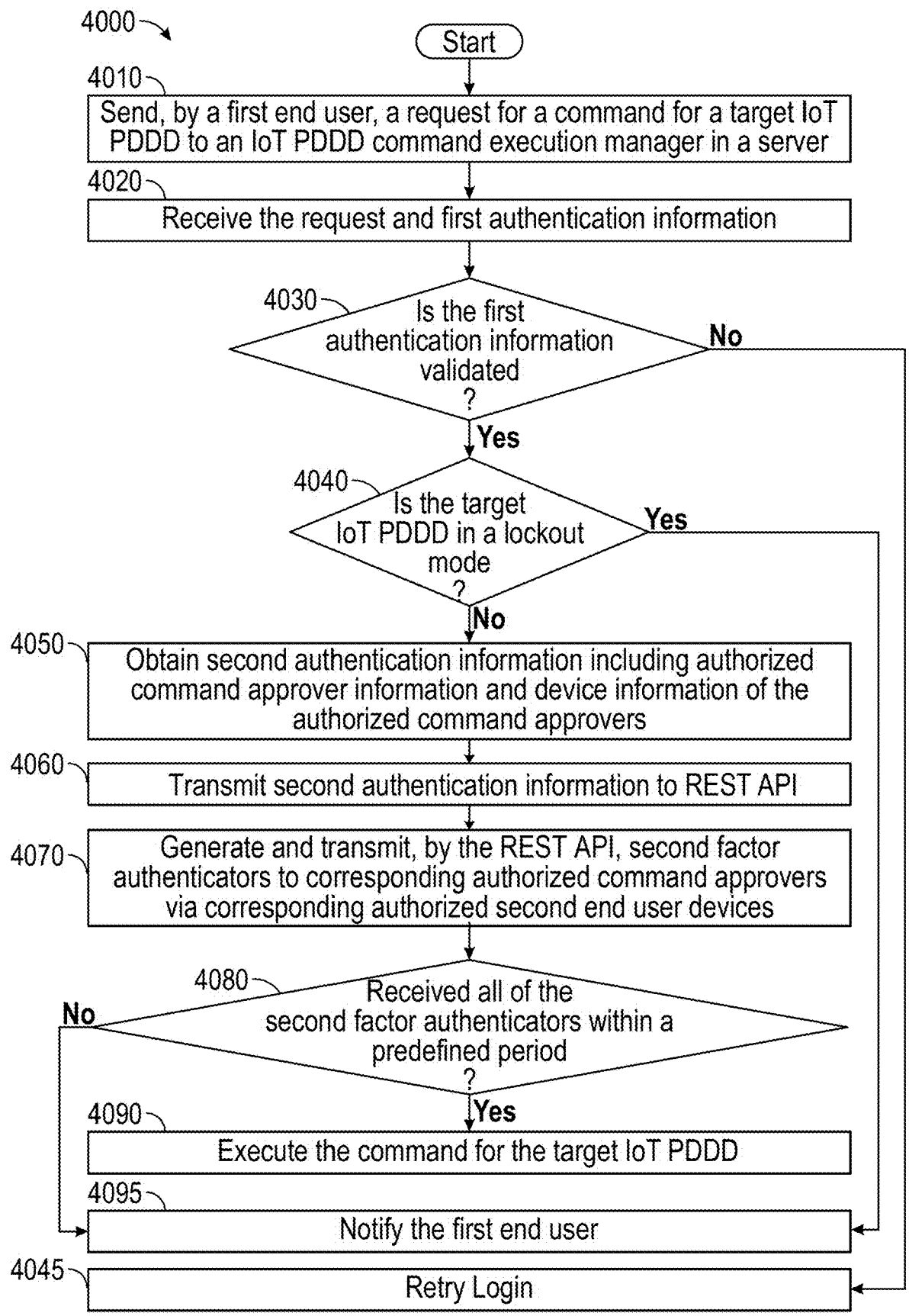
FIG. 4 is a flow-chart for a method of securely executing commands in IoT PDDDs via a cloud server in accordance with a non-limiting embodiment of the disclosed concept.

FIG. 4 is a flow-chart for a method 4000 of securely executing a command in IoT PDDDs via a cloud server in accordance with a non-limiting embodiment of the disclosed concept. The method 4000 may be performed by the system 10 of FIGS. 1-2 and its components thereof.

At 4010, a first end user sends a request for a command for a target IoT PDDD to an IoT PDDD command execution manager in a cloud server. The first end user sends the request directly to the IoT PDDD command execution manager in a wireless connection or indirectly via a gateway in a wireless or wired connection.

At 4020, the IoT PDDD command execution manager receives the request via the REST API.

At 4030, the authentication module of the IoT PDDD command execution manager determines if a first authentication information is to be validated based on an authentication catalog stored in a memory of the IoT PDDD command execution manager. If no, the method 4000 proceeds to 4045 at which the REST API notifies user of the failure of the first authentication information. If yes, the method 4000 proceeds to 4040.

At 4040, the authentication module determines if the target IoT PDDD is in a lockout mode. If yes, the method 4000 proceeds to 4050.

At 4050, the authentication module obtains second authentication information including authorized command approver information and device information of the authorized command approvers based on the authentication catalog.

At 4060, the authentication module transmits the second authentication information to the REST API.

At 4070, the REST API generates and transmit second factor authenticators to corresponding authorized command approvers via corresponding authorized second end user devices. The second factor authenticator may be a one-time-passcode that expires within a predefined period, e.g., without limitation, 60s, 90s, 120, etc. Each second factor authenticator directed to corresponding authorized command approver may differ from other second factor authenticators directed to remaining authorized command approvers.

At 4080, the REST API determines if it has received all of the second factor authenticators within the predefined period. If yes, the method 4000 proceeds to 4090. If no, the method 4000 proceeds to 4095 at which the REST API notifies the first end user of the failure to validate the second factor authenticators.

At 4090, the command execution module of IoT PDDD command execution manager executes the command requested for the target IoT PDDD via the REST API.

Figure 5:
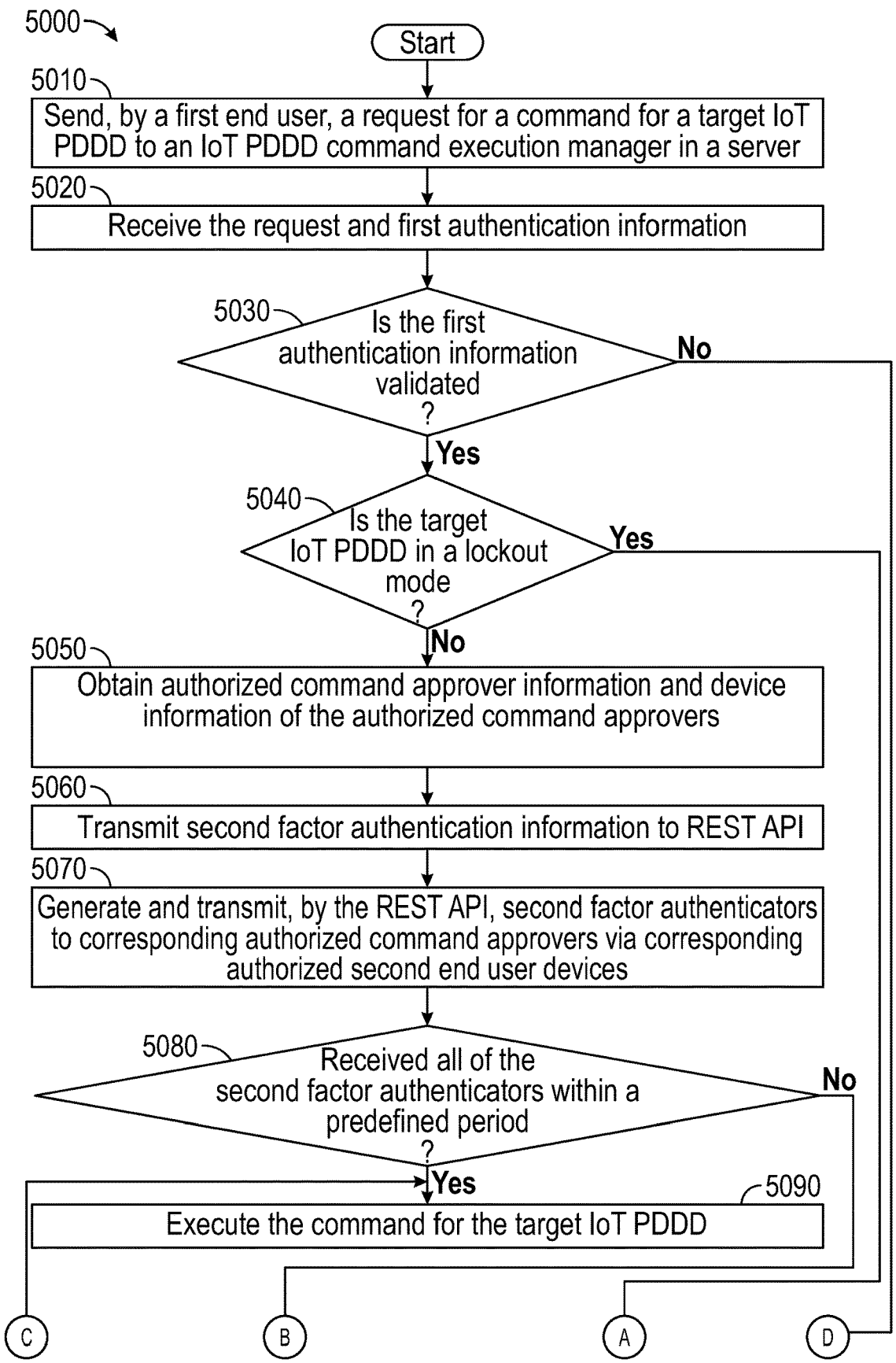
FIG. 5 is a flow-chart for a method of securely executing commands in IoT PDDDs via a cloud server in accordance with a non-limiting embodiment of the disclosed concept.
Figure 5:
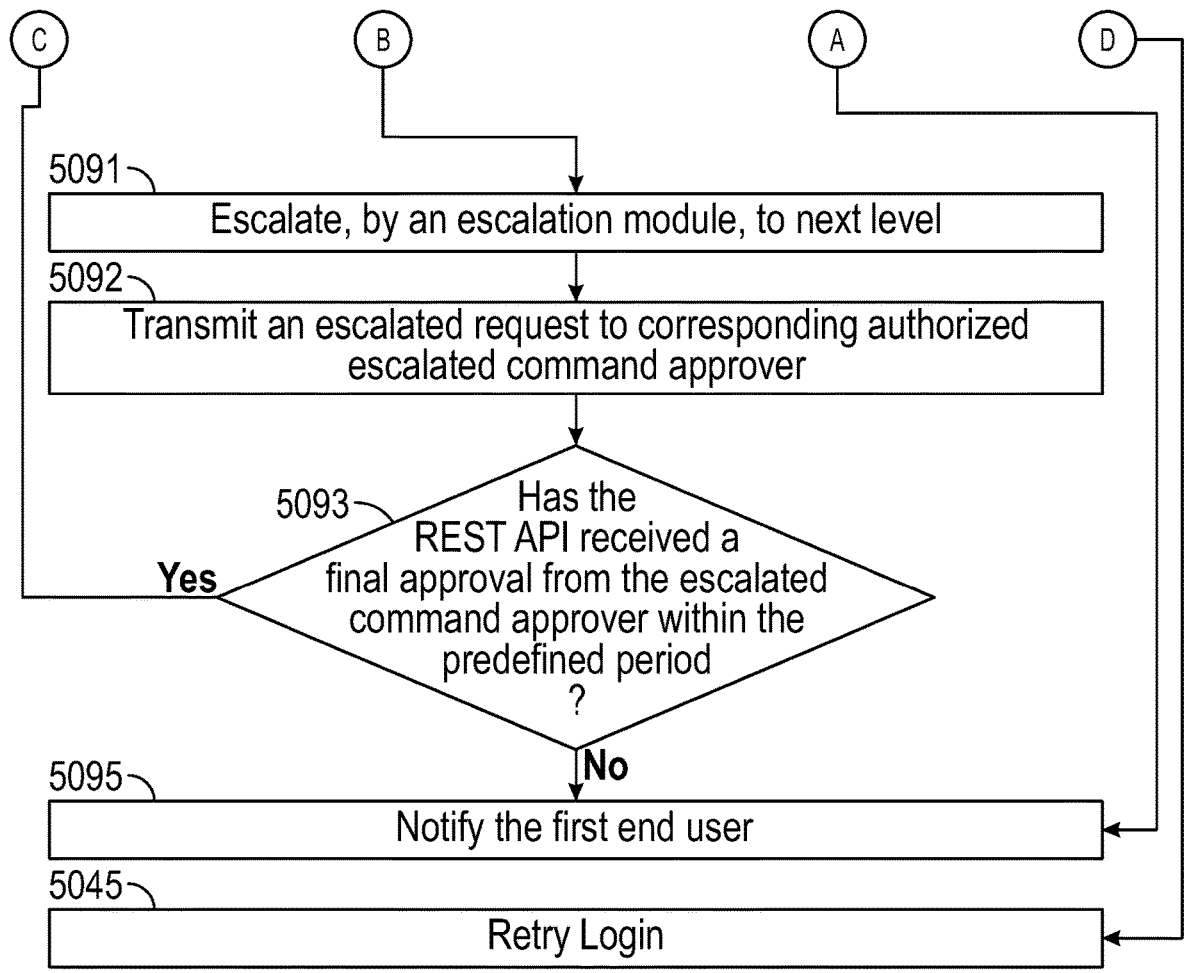

FIG. 5 is a flow-chart for a method 5000 of securely executing a command in IoT PDDDs via a cloud server in accordance with a non-limiting embodiment of the disclosed concept. The method 5000 may be performed by the system 10 of FIGS. 1-2 and its components thereof.

At 5010, a first end user sends a request for a command for a target IoT PDDD to an IoT PDDD command execution manager in a cloud server. The first end user sends the request directly to the IoT PDDD command execution manager in a wireless connection or indirectly via a gateway in a wireless or wired connection.

At 5020, the IoT PDDD command execution manager receives the request via the REST API.

At 5030, the authentication module of the IoT PDDD command execution manager determines if a first authentication information is to be validated based on an authentication catalog stored in a memory of the IoT PDDD command execution manager. If no, the method 5000 proceeds to 5045 at which the REST API notifies user of the failure of the first authentication information. If yes, the method 5000 proceeds to 5040.

At 5040, the authentication module determines if the target IoT PDDD is in a lockout mode. If yes, the method 5000 proceeds to 5050.

At 5050, the authentication module obtains second authorization information including authorized command approver information and device information of the authorized command approvers based on the authentication catalog.

At 5060, the authentication module transmits the second factor authentication information to the REST API.

At 5070, the REST API generates and transmit second factor authenticators to corresponding authorized command approvers via corresponding authorized second end user devices. The second factor authenticator may be a one-time-passcode that expires within a predefined period, e.g., without limitation, 60s, 90s, 120, etc. Each second factor authenticator directed to corresponding authorized command approver differs from other second factor authenticators directed to remaining authorized command approvers.

At 5080, the REST API determines if it has received all of the second factor authenticators within the predefined period. If yes, the method 5000 proceeds to 5090. If no, the method 5000 proceeds to 5091 at which the escalation module of the IoT PDDD command execution manager escalates to the next level of approval based on an escalation matrix stored in the memory. At 5092, the RESTAPI transmits an escalated request to corresponding authorized escalated command approver of one or more non-responsive command approvers. At 5093, the REST API determines if it has received final approval from the escalated command approver within the predefined period. If no, the REST API notifies the first end user of the failure to validate the second factor authenticators and the failure to receive an escalated command approval. If yes, the method 5000 proceeds to 5090.

At 5090, the command execution module of the IoT PDDD command execution manager executes the command requested for the target IoT PDDD via the REST API.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A system, comprising:
a facility including a plurality of Internet-of-Things (IoT) power distribution and defense devices (PDDDs);
a first end user device structured to transmit a request for a command for a target IoT PDDD based on a first user input from an authorized first end user;
a plurality of second end user devices structured to receive second factor authenticators based on a first tier validation of the request in a two-tiered validation and return the second factor authenticators for a second tier validation of the request based on second user inputs from corresponding authorized command approvers; and
a cloud network including a (Representational State Transfer Application Programming Interface) REST API and a cloud server, the REST API being communicatively coupled to the IoT PDDDs, the first end user device and the second end user devices and structured to interface therewith for the two-tiered validation of the request and execution of the command, the cloud server including an IoT PDDD commands execution manager coupled to the REST API and structured to perform the two-tiered validation of the request and execute the command for the target IoT PDDD based on the successful validation via the REST API,
wherein the IoT PDDD comprises a memory having an authentication catalog, an authentication module, a validation rules configuration module, a command execution module and a lockout module,
wherein the two-tiered validation includes a first validation of a first authentication information and a second validation of second factor authenticators returned from authorized command approvers via the authorized second end user devices, and the authentication module is structured to perform the two-tiered validation based on the authentication catalog.

2. The system of claim 1, wherein the authentication catalog includes a list of IoT PDDDs executable by the IoT PDDD remotely executable by the command execution module, a list of command IDs for each listed IoT PDDD, a list of the device information of authorized first end user devices that are allowed to transmit a request for a command for execution of each listed IoT PDDD, a list of user credentials of authorized first end users who are allowed to make the request, and a list of the device information of authorized second end user devices via which authorized command approvers are allowed to receive and return respective second factor authenticators to the REST API.

3. The system of claim 1, wherein the validation rules configuration module is structured to configure validation rules setting for the two-tiered validation, and the two-tiered validation is modifiable by authorized end users.

4. The system of claim 1, wherein first authentication information includes a target IoT PDDD ID, a command ID, user credentials of the first end user, and device information of the first end user device including MAC and IP addresses of the first end user device, and wherein the authentication module is structured to receive the first authentication information from the REST API and validate the first authentication information based on a determination that the user credentials of the first end user and the device information of the first end user device transmitting the request match authorized user credentials and device information of authorized first end user device corresponding to the authorized user credentials.

5. The system of claim 4, wherein upon validating the first authorization information, the authentication module terminates the two-tier validation based on a determination that the target IoT PDDD is in a lockout mode.

6. The system of claim 4, wherein based on a determination that the target IoT PDDD is not in a lockout mode, the authentication module identifies authorized command approvers for the request, obtains authorized command approver information for the target IoT PDDD, and transmits the authorized command approver information to the REST API.

7. The system of claim 6, wherein the REST API generates and transmits second factor authenticators to the authorized command approvers via corresponding authorized second end user devices.

8. The system of claim 7, wherein the command execution module executes the command for the target IoT PDDD via the REST API based on a determination that the REST API has received all of the second factor authenticators back from the authorized command approvers within a predefined period.

9. The system of claim 7, wherein the IoT PDDD command execution manager includes an escalation module structured to escalate the second tier validation based on a determination that the REST API has not received all of the second factor authenticators back from the authorized command approvers within a predefined period.

10. The system of claim 8, wherein the escalation module accesses an escalation matrix and identifies an authorized escalated command approver corresponding to a non-responsive command approver and transmits the information of the authorized escalated command approver and device information of an authorized third user device corresponding to the authorized escalated command approver to the REST API.

11. The system of claim 10, wherein the REST API generates and transmits a third factor authenticator to the authorized escalated command approver and wherein the command execution module executes the command based on a determination that the REST API has received the third factor authenticator from the authorized escalated command approver within a predefined period.

12. A method of executing device command for a target Internet-of-Things (IoT) power distribution and defense devices (PDDDs) via a cloud network including a (Representational State Transfer Application Programming Interface) REST API and a cloud server, the method comprising:
   transmitting, by a first end user device, a request for a command for a target IoT PDDD based on a first user input from an authorized first end user;
   performing, by an IoT PDDD command execution manager in the cloud server, a two-tier validation of the request includes a first tier validation of a first authentication information and a second tier validation of second factor authenticators returned from authorized command approvers via the authorized second end user devices to the REST API; and
   executing, by IoT PDDD command execution manager, the command requested based on a successful two-tier validation of the request,
   wherein the performing, by the IoT PDDD command execution manager, of the two-tier validation of the request comprises:
      validating the first authentication information based on an authentication catalog,
      generating and transmitting, by the REST API, second factor authenticators to the authorized command approvers, and
      determining if the REST API has received all of the second factor authenticators from the authorized command approvers within a first predefined period.

13. The method of claim 12, further comprising:
   in response to determining that the REST API has received all of the second factor authenticators, determining that the target IoT PDDD is not in a lockout mode; and
   executing, by the IoT PDDD command execution manager, the command requested for the target IoT PDDD via the REST API.

14. The method of claim 12, further comprising:
   in response to determining that the REST API has not received all of the second factor authenticators from the authorized command approvers within the first predefined period, escalating the request.

15. The method of claim 13, wherein the escalating the request comprises:
   accessing, by an escalation module of the IoT PDDD command execution manager, an escalation matrix including user credentials of authorized escalated command approvers corresponding to each command approver and device information of authorized third end user device corresponding to the authorized escalated command approvers;
   identifying an authorized escalated command approver corresponding to a non-responsive command approver based on the escalation matrix;
   transmitting the authorized escalated command approver information and device information of an authorized third user device corresponding to the authorized escalated command approver to the REST API;
   generating and transmitting, by the REST API, a third factor authenticator to the authorized escalated command approver; and
   executing, by the IoT PDDD command execution manager, the command based on a determination that the REST API has received the third factor authenticator back from the authorized escalated command approver within a second predefined period.

16. The method of claim 12, further comprising:
   locking out, by an administrator of the facility during maintenance activity for a third predefined period; and
   releasing the lock-out upon a lapse of the third predefined period.

17. The method of claim 12, wherein the IoT PDDDs and the REST APIs interface directly or via a gateway.

* * * * *